July 23, 1935. G. W. BRADY 2,008,744
SECONDARY RACK
Filed Aug. 11, 1933
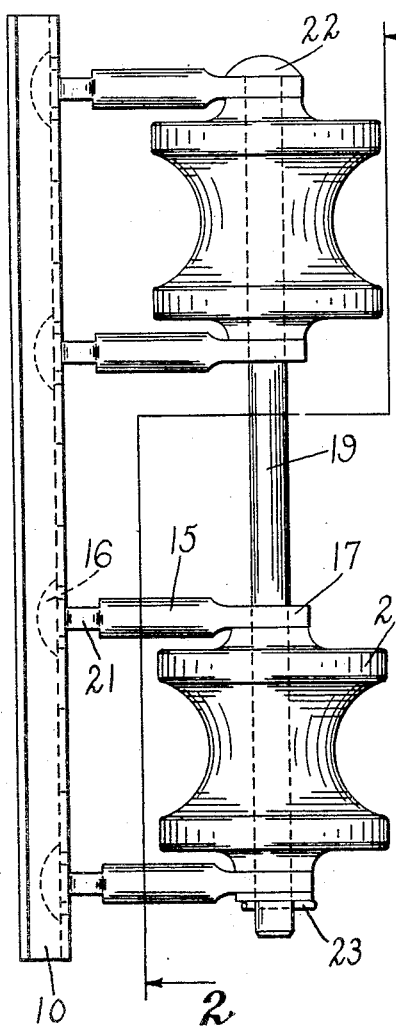
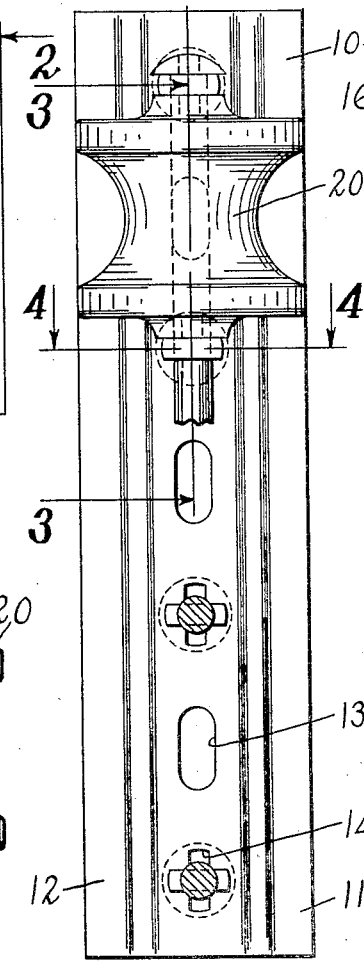
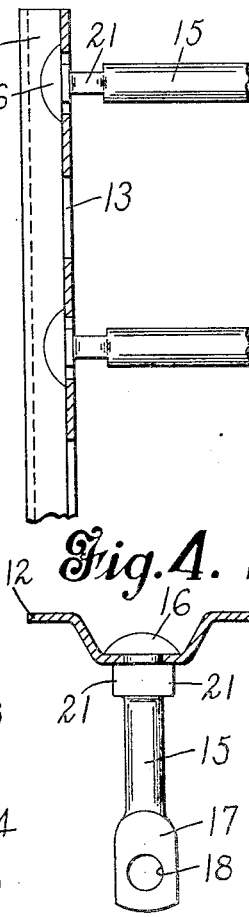
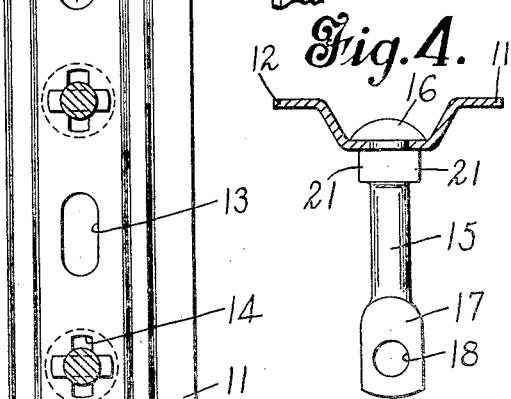

Patented July 23, 1935

2,008,744

UNITED STATES PATENT OFFICE 2,008,744

SECONDARY RACK

George W. Brady, New Britain, Conn., assignor to The Brady Electric & Manufacturing Company, New Britain, Conn., a corporation of Connecticut Application August 11, 1933, Serial No. 684,622

8 Claims. (Cl. 173—321)

This invention relates to insulator supports or so-called secondary racks commonly used in connection with supporting insulators for power and light conductors. Such devices ordinarily comprise a base member provided with supporting elements projecting therefrom, which supporting elements are designed to receive a rod or the like upon which the insulators are mounted.

There is shown in the Brady Patent No. 1,802,965 dated Apr. 28, 1931 a secondary rack wherein the projecting elements on the base member are of U-shaped or clevis form and are detachably secured to the base member. In the present instance, a base member of similar form is employed but the projecting elements to support the rod upon which the insulators are mounted are of a form quite different from that shown in the prior patent above referred to.

One object of the present invention is to provide a form of secondary rack which may be manufactured economically at a relatively low cost, and which at the same time will be of strong construction and efficient in operation.

Another object of the invention is to provide a so-called secondary rack wherein ordinary bolts may be employed to secure the insulator-supporting rod to the base member.

A still further object of the invention is to provide a secondary rack comprising a base member and bolts secured thereto in a projecting position, the bolts being detachably secured to the rack so that they may be connected thereto or disconnected therefrom at will prior to installation.

To these and other ends, the invention consists in the novel features and combinations of parts to be hereinafter described and claimed.

In the drawing:

Fig. 1 is a side elevational view of a secondary rack embodying my invention;

Fig. 2 is a partial sectional view on line 2—2 of Fig. 1;

Fig. 3 is a sectional view on line 3—3 of Fig. 2;

Fig. 4 is a sectional view on line 4—4 of Fig. 2.

To illustrate a preferred embodiment of my invention, I have shown an elongated base member 10 of channeled cross section, as shown more especially in Fig. 4, having side flanges 11 and 12 which cause the body portion of the base member to stand out from the support to which it may be connected. The base member may be connected to the wall of a building or to other suitable support by screws, bolts, or the like, and may be provided with openings 13 for this purpose.

The body portion of the base member is provided with openings 14 in which are received the members for holding the insulator supporting rod. These openings 14 are of keyhole shape, having a circular central portion and winged portions extending therefrom for a purpose to be hereinafter explained.

The members for holding the insulator supporting rods consist of bolts 15 having the usual heads 16 upon one end. These bolts are flattened, as shown at 17, adjacent their outer ends and are provided in the flattened portions with openings 18 to receive the rod or bolt 19 upon which the insulators 20 are supported. The bolts 15 may also be "lugged" or provided with laterally projecting lugs 21 at a point adjacent to, but slightly spaced from, the head 16. Preferably, the lugs 21 extend laterally in line with, or in registration with, the flattened portions 18.

It will be apparent that the base member 10 and the bolts 15 may be completely formed prior to their assembly. Afterward the bolts may be inserted through the openings 14 by reason of the keyhole shape of these openings when the flattened portion 18 and the lugs 21 are brought into registration with the winged portions of the openings. After the bolts have been inserted into the openings until the head 16 strikes the body portion of the base member, the bolts may be given a quarter turn and they will be held against displacement by reason of the fact that the body portion of the base member will be confined between the heads of the bolts 16 and the lugs 21, as shown in Fig. 4.

It will be understood that as many bolts 15 as is desired may be secured to the base member 10, which may, of course, be made of any appropriate length. Insulators 20 may be placed between the bolts 15, the insulators having openings registering with the openings 18 so that the rod or bolt 19 may be threaded through these openings, as shown in Fig. 1. This rod may be held in place by means of the head 22 at one end and a cotter pin 23 inserted through an opening in the bolt at the other end.

It will be understood that the invention is not necessarily limited to the form of bolts upon which the lugs or flattened portions 21 are provided as these may be omitted if desired. In this event the bolts will be retained in the rack by means of the flattened ends 17.

While I have shown and described a preferred embodiment of my invention, it will be understood that it is not to be limited to all of the details shown, but is capable of modification and variation within the spirit of the invention and within the scope of the appended claims.

What I claim is:

1. In a wire supporting device, a plate-like member having openings therein and supporting members projecting from said plate member, said supporting members comprising headed bolts having their body portions inserted through said openings with the heads thereof abutting the rear face of the plate member, the unheaded ends of said bolts being flattened and provided with openings to receive a rod or the like, and the openings in said plate being of keyhole shape whereby the flattened ends of the bolts may be inserted therethrough in one position and then rotated to prevent removal, and a rod positioned in the openings of adjacent bolts to prevent rotation thereof when mounted in said plate-like member.

2. A wire supporting device comprising a plate-like member having a plurality of openings therein, headed bolts inserted through said openings from the rear side of the plate member whereby the bolt heads abut the rear face of said member and the body portions of the bolts extend substantially at right angles to the base member, the unheaded ends of said bolts being flattened and provided with openings, said openings being substantially in alignment to receive a rod or the like for supporting an insulator, and the openings in said plate being of keyhole shape whereby the flattened ends of the bolts may be inserted therethrough in one position and then rotated to prevent removal, and said rod securing said bolts against rotation when received in the openings therein.

3. An insulator supporting device comprising a plate-like member having openings therein of keyhole shape, a plurality of headed bolts inserted through said openings from the rear face of said member, each of said bolts being provided with laterally extending lugs adjacent the head thereof whereby said lugged bolt may be inserted through said openings and then rotated to prevent removal thereof, and also provided with a flattened perforated outer end to receive a retaining rod.

4. An insulator supporting device comprising a plate-like member having openings of keyhole shape therein, a plurality of bolts, each having a head upon one end and laterally extending lugs adjacent, but slightly spaced from, said head, said bolts being inserted through said openings and then given a partial rotation whereby the edges of the openings in the plate will lie between the bolt heads and said lugs, and retaining means passed through the ends of adjacent bolts to prevent rotation thereof.

5. An insulator supporting device comprising a plate-like member having openings therein of keyhole shape, headed bolts inserted through said openings, said bolts having laterally extending lugs adjacent the heads thereof and also having their unheaded ends flattened and perforated, said openings in the plate member having rounded central portions substantially equal in diameter to the diameter of the bolts, and having wing portions adapted to receive the flattened end and the lugs upon the bolts.

6. An insulator supporting device comprising a plate member having openings therein of keyhole shape, headed bolts having rounded bodies and flattened perforated unheaded ends, said bolts also being provided with laterally extending lugs adjacent the heads thereof, said lugs and said flattened ends projecting laterally from the rounded bodies of the bolts, whereby said bolts may be inserted through said openings in certain positions only thereof and then rotated to locking position, and said openings in the flattened ends of the bolts registering with each other to permit insertion of a rod through a plurality of said bolts when the latter are in said locking position.

7. An insulator supporting device comprising a plate-like member having openings therein of keyhole shape, headed bolts inserted through said openings, said bolts having laterally extending lugs adjacent the heads thereof and also having their unheaded ends flattened and perforated, said openings in the plate member having rounded central portions substantially equal in diameter to the diameter of the bolts, and having wing portions adapted to receive the flattened end and the lugs upon the bolts, and a rod-like member extending through the perforations of said bolts and securing them against rotational movement when attached to said plate-like member.

8. An insulator supporting device comprising a supporting member having a series of spaced elongated openings therein, a plurality of bolt-like members passing through said openings and attached to the supporting member in spaced relation, means on each of said bolt-like members for attaching them to the supporting member by rotational movement relatively thereto, said means comprising a head at one end of the bolt-like member of a size too large to pass through said openings and a flattened portion at the other end of said member adapted to pass through said openings in one position thereof, said flattened portion having an opening therein, and a rod-like element passing through the openings in said bolt-like members and securing them against rotational movement.

GEORGE W. BRADY.